United States Patent

Brockmuller et al.

[15] 3,637,093
[45] Jan. 25, 1972

[54] PALLETING APPARATUS

[72] Inventors: Friedrich Franz Brockmuller, Lengerich of Westphalia; Karl Haupt, Wolbeck via Munster, both of Germany

[73] Assignee: Windmoller & Holscher, Lengerich of Westphalia, Germany

[22] Filed: Jan. 6, 1970

[21] Appl. No.: 922

[30] Foreign Application Priority Data

Jan. 7, 1969 Germany.....................P 19 00 615.6

[52] U.S. Cl..............................................................214/6 P
[51] Int. Cl................................................................B65g 57/22
[58] Field of Search..........................214/6 DK, 6 H, 6.5, 6 P

[56] References Cited

UNITED STATES PATENTS

| | | | |
|---|---|---|---|
| 1,556,695 | 10/1925 | Kronborg | 214/6 DK |
| 2,234,990 | 3/1941 | Todhunter | 214/6 DK X |
| 3,130,839 | 4/1964 | Grasvoll | 214/6 DK |
| 3,169,646 | 2/1965 | Mason | 214/6 DK |
| 3,312,357 | 4/1967 | Stephens et al. | 214/6 DK |
| 3,393,812 | 7/1968 | Mayo et al. | 214/6 DK |
| 3,437,215 | 4/1969 | Lunden | 214/6 DK |
| 3,446,368 | 5/1969 | Nelson | 214/6 DK |

*Primary Examiner*—Gerald M. Forlenza
*Assistant Examiner*—Robert J. Spar
*Attorney*—Fleit, Gipple & Jacobson

[57] ABSTRACT

A delivery conveyor, a supply conveyor of variable length, a roller track, a pronged rake movable between the rollers of the roller track for lifting an article from the top surface of the roller track, a sequentially rotatable and vertically movable pallet support next to the roller track, and a second pronged rake movable for sweeping the lifted article onto the pallet from the first-mentioned pronged rake.

9 Claims, 6 Drawing Figures

INVENTORS
Friedrich Franz BROCKMULLER,
Karl HAUPT

BY
Fleit, Gipple & Jacobson
his ATTORNEYS

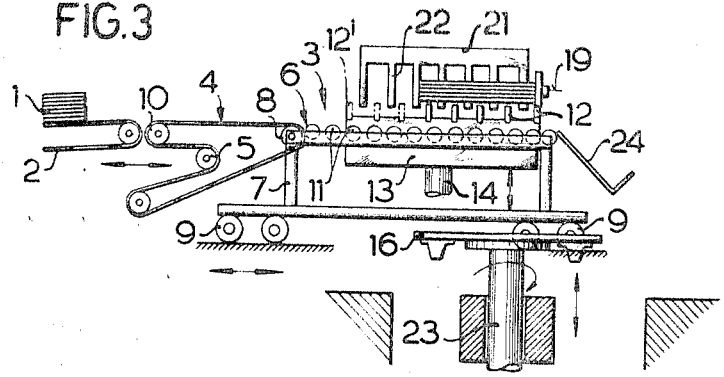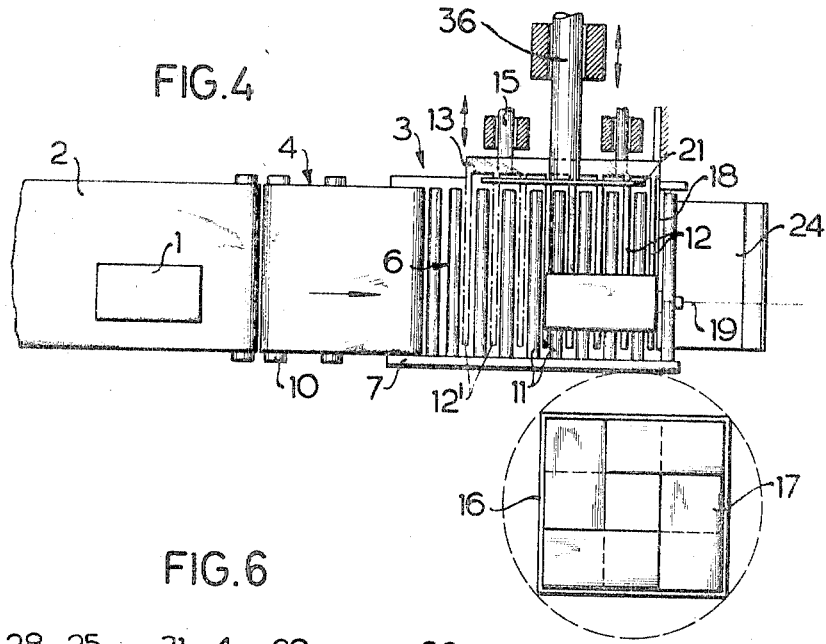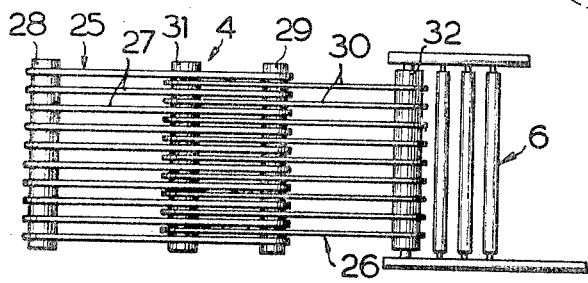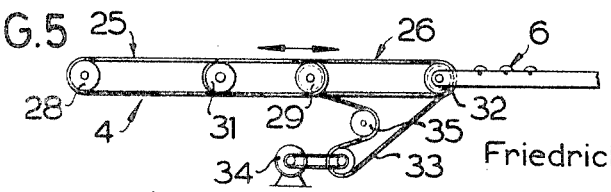

PALLETING APPARATUS

The invention relates to palleting apparatus, especially for assembling on pallets stacks of flattened tubular film sections intended to be made into sacks or bags, the palleting apparatus comprising a transfer station at the end of a conveyor and an intermittently rotatable pallet support which is arranged adjacent the transfer station and can be lowered by a distance equivalent to the height of one layer of articles on the pallet after each complete layer of articles has been deposited.

Hitherto, the stacks of tubular film sections had to be placed on the pallets by hand from the transfer station. In known equipment of this kind, the stacks arrive on a delivery conveyor and are stacked on the pallet by operators. To avoid the need for the operators to run around the pallets, it has already been proposed to provide the aforementioned pallet support which rotates intermittently and which can also be lowered after each layer of stacks has been deposited on the pallet so that the level for the next layer of stacks is at a height convenient to the operators.

The invention aims to provide an apparatus that enables transfer of the stacks to the pallet to be performed fully automatically.

According to the invention, a palleting apparatus comprises a transfer station at the end of a delivery conveyor for articles that are to be deposited on a pallet in layers, means disposed adjacent said transfer station for supporting the pallet, said pallet-supporting means being adapted to be rotated intermittently and to be lowered by a distance equivalent to the height of one layer of articles on the pallet after each complete layer of articles has been deposited, wherein said transfer station comprises a plurality of rotatable rollers forming a roller track for receiving and supporting the articles and having axes extending transversely to the conveying direction of said delivery conveyor, a transfer rake having prongs that are parallel to said rollers and of substantially the same length as said rollers, said transfer rake being vertically movable from a first position at which said prongs are disposed between said rollers beneath an article thereon to an elevated second position at which said prongs and any article thereon are disposed above the supporting plane of said roller track and also being horizontally movable to an elevated third position at which said prongs and any article thereon are disposed above said pallet, and means for sweeping an article off the said prongs for depositing it on the said pallet.

Thus, the transfer rake can lift each article arriving at the transfer station, namely each stack of flattened tubular film sections, and transport it without human intervention to the pallet where, while the rake is being retracted from the said third position to the said second position, the article thereon is held back by the said sweeping means. In conjunction with the rotatable and lowerable construction of the pallet-supporting means, palleting of the articles can therefore be performed fully automatically.

To facilitate stable stacking of the layers on the pallet, it is desirable for the stacks of each layer to be staggered in relation to the stacks of the subjacent layer. This can be achieved if the roller track and transfer rake are displaceable after each layer of articles has been deposited on the pallet, thereby changing the location of deposition of articles that are to form the next layer. If such displacement of the roller track and transfer rake is in a direction lengthwise of the conveying direction of the delivery conveyor, it is preferred to interpose a supply conveyor of variable length between the delivery conveyor and the roller track. In a first embodiment of such a supply conveyor, it comprises an endless belt extending over a first direction changing roll of fixed location at its upstream end and, at the downstream end, over a second direction changing roll which is mounted in a frame that also supports the said roller track, a tensioning roll being provided for said supply conveyor intermediate the direction changing rolls. In another embodiment, the variable length supply conveyor comprises two interengaging belt conveyor sections of which one is connected to said roller track and is displaceable together therewith. The two conveyor sections may be connected to a common drive through a common chain transmission which is equipped with a tensioning sprocket for compensating length variations. Further, it is preferable if the rollers of the roller track are driven by aforesaid second direction changing roll so that the speed imparted by the rollers to an article thereon is substantially equal to the speed of the supply conveyor.

In one form of the invention, a stop plate is provided at the transfer station, possibly of the transfer rake, and extends transversely to the conveying direction. The stop plate is provided with a contact for actuating transfer movement of the transfer rake. The sweeping means may comprise a further rake that has prongs engaging between the prongs of the transfer rake and that is movable up to the pallet in the same direction as the transfer rake. However, return movement of the sweeping rake is somewhat delayed relatively to return movement of the transfer rake so that the transfer stack of tubular films will be swept onto the pallet. The apparatus can of course be provided with means for setting the components to suit different dimensions of film sections. For example, the distance by which the roller track is displaced for the purpose of changing the location of deposition of the stacks on the pallet should be set to suit the length or width of film sections in each stack.

Two examples of the invention are illustrated in the accompanying diagrammatic drawings, wherein:

FIG. 3 is a side elevation showing the transfer station in a second limiting position;

FIG. 4 is a plan on the FIG. 3 apparatus;

FIG. 5 is a fragmentary side elevation of a supply conveyor for a modified form of palleting apparatus, and FIG. 6 is a plan view of the supply conveyor of FIG. 5.

Figure 1:
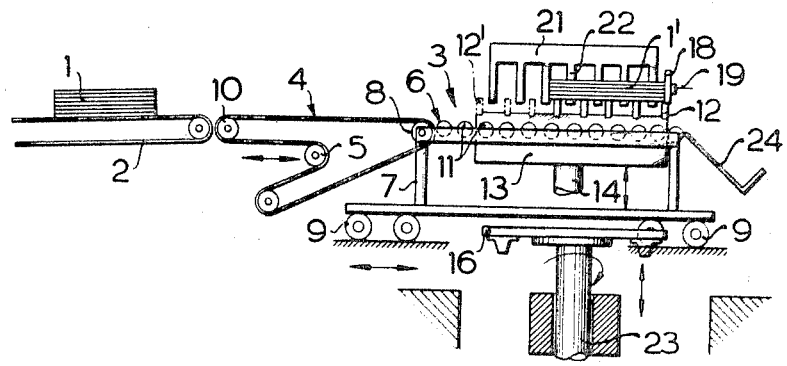
FIG. 1 is a side elevation of a palleting apparatus in which the transfer station is located in a first limiting position.
Figure 2:
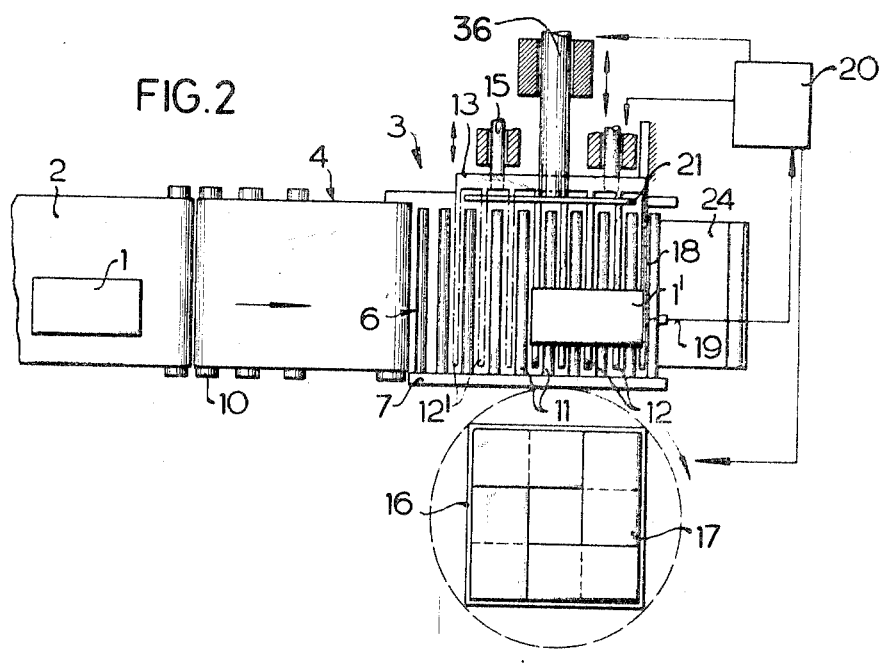
FIG. 2 is a plan on the FIG. 1 apparatus.

As shown in FIGS. 1 and 2, a packet or stack 1 of tubular film sections is transported to a transfer station 3 on a delivery conveyor 2. By means of a supply conveyor 4 which is adjustable in length and which is provided with a spring-influenced tensioning roller 5, the stacks 1 are fed to a roller track 6 comprising a frame 7 which supports a direction-changing roll 8 at the downstream end of the belt 4. The roll 8 together with rollers 11 of the roller track 6 are displaceable with the aid of displacing means 9. The rollers 11 are driven by the roll 8 so that the speed imparted to the stacks 1 by the rollers is substantially the same as the speed of the belt 4. A direction-changing roll 10 at the upstream end of the conveyor belt 4 is fixed in location. Disposed between the individual uniformly driven rollers 11 of the roller track 6 there are prongs 12 of a transfer rake 13. In a first position (not shown), these prongs are located below the transporting plane of the rollers 11. By means of hydraulic lifting apparatus 14 the transfer rake 13 can be elevated and by means of hydraulic apparatus 15 the transfer rake can be reciprocated to and from the pallet 16 or rather to and from a composite stack 17 made up of layers of individual stacks of tubular film sections.

FIG. 1 shows the transfer rake 13 just after it has been elevated. Subsequently the stack 1' located on the prongs of the transfer rake will be deposited on the composite stack 17. The transfer operation is actuated by the arriving stack 1' itself because the latter strikes a stop plate 18 on the rake 13 and thereby actuates a contact 19 which delivers a signal to a program control device 20. When the rake 13 is located at a predetermined position above the composite stack 17, a further impulse will actuate hydraulic apparatus 36 to initiate displacement of a sweeping rake 21 having prongs 22 which engage between those of the rake 13, the latter being lowered onto the composite stack 17 that has already been formed on the pallet 16. The rake 13 is then retracted so that the stack 1' is swept off by the vertical prongs 22 of the sweeping rake, whereupon the sweeping rake itself will be returned to its starting position. The rotatable and lowerable lifting means 23 on which the pallet 16 is supported will now receive an impulse from the device 20 so that it is turned through one-quarter of one revolution. After every four quarter-revolutions one layer of stacks will have been deposited on the composite stack 17 and the lifting device 23 will receive and impulse so that the pallet 16 is lowered by a distance equivalent to the height of one stack. The control for lowering the pallet is preferably effected by sensing the height of the stack such as by means of a photocell, this enabling differences in height between the individual stacks to be taken into account.

Since it is desirable for the next layer of stacks to be staggered in relation to the layer that has just been deposited on the composite stack 17 so that the latter has sufficient stability imparted to it, the transfer station 3 is displaced towards the left hand side as viewed in FIG. 1 by a distance equivalent to the width of a stack. Transfer to the stacks 1 will now take place at the left-hand portion of the transfer station 3 and stack 17. This position is illustrated in FIGS. 3 and 4. The spacing between the direction-changing rolls 8 and 10 of the supply conveyor belt 4 has been correspondingly reduced by a distance equal to the width of a stack. The plan view of the composite stack 17 in FIG. 4 shows the individual stacks of a layer that has been deposited on the stacks of the layer visible in FIG. 2 after four one-quarter revolutions of the device 23. The second from uppermost layer of stacks in FIG. 4 is shown in chain-dotted lines and of course corresponds to the position of the stacks that will later be deposited over the stacks shown in full lines in FIG. 4. A depositing table 24 can be used for temporarily storing any stacks 1 that might have been taken off the roller track 6 by hand while a fully laden pallet 16 is being exchanged for an empty pallet.

At least some of the prongs 12 are removable from the transfer rake 13. In the drawings, the first three prongs on the left-hand side are indicated in chain-dotted lines at 12'. When handling stacks of a length as illustrated, these prongs 12' are removed from the transfer rake as they would otherwise interfere with the composite stack 17 by pushing off the first stack of any one layer as the last stack of that layer is being deposited. By means of the removable prongs, it can be ensured that the length of the transfer rake will not exceed the length of the stacks that are to be palleted.

In FIGS. 5 and 6, the supply conveyor 4 consists of two interengaging belt conveyor sections 25 and 26. The section 25 comprises belts 27 extending around rolls 28 and 29 while the conveyor section 26 comprises belts 30 extending around rolls 31 and 32. The arrangement is such that along the overlapping path between the rolls 29 and 31 the belts 27 and 30 are alternated. The conveyor section 25 is fixed in location. The conveyor section 26 is displaceable in that the rolls 31 and 32 are carried by the roller track which is itself displaceable. Similar to the previously described embodiment, the rollers of the roller track 6 are driven by the roll 32 so that the speed imparted to the stacks by the rollers of the track 6 is substantially equal to the speed of the supply conveyor 4 of which the two sections 25 and 26 are driven by a common chain transmission 33 from a drive motor 34. A length-compensating sprocket 35 maintains a constant tension in the chain transmission 33 when the transfer station is displaced. This ensures that no speed differences between the belt sections 25 and 26 is set up during reciprocation of the transfer station.

We claim:

1. Palleting apparatus comprising a transfer station at the end of a delivery conveyor for articles that are to be deposited on a pallet in layers, means disposed adjacent said transfer station for supporting the pallet, said pallet-supporting means being adapted to be rotated intermittently and to be lowered by a distance equivalent to the height of one layer of articles on the pallet after each complete layer of articles has been deposited, wherein said transfer station comprises a plurality of rotatable rollers forming a roller track for receiving and supporting the articles and having axes extending transversely to the conveying direction of said delivery conveyor, a transfer rake having prongs that are parallel to said rollers and of substantially the same length as said rollers, said transfer rake being vertically movable from a first position at which said prongs are disposed between said rollers beneath an article thereon to an elevated second position at which said prongs and the article thereon are disposed above the supporting plane of said roller track and also being horizontally movable to an elevated third position at which said prongs and the article thereon are disposed above said pallet, and means for sweeping an article off the said prongs for depositing it on the said pallet, said roller track and transfer rake being displaceable in a direction lengthwise of the conveying direction of said delivery conveyor after each layer of articles has been deposited on said pallet so as to change the location of disposition of articles that are to form the next layer.

2. Apparatus according to claim 2, including a supply conveyor of variable length interposed between said delivery conveyor and said roller track.

3. Apparatus according to claim 2, wherein said supply conveyor comprises an endless belt extending over a first direction-changing roll of fixed location at its upstream end and, at the downstream end, over a second direction-changing roll which is mounted in a frame that also supports said roller track, a tensioning roll being provided for said supply conveyor intermediate said direction changing rolls.

4. Apparatus according to claim 3, wherein the rollers of said roller track are driven by said second direction-changing roll so that the speed imparted by said rollers to an article thereon is substantially equal to the speed of said supply conveyor.

5. Apparatus according to claim 2, wherein said variable length supply conveyor comprises two interengaging belt conveyor sections of which one is connected to said roller track and is displaceable together therewith.

6. Apparatus according to claim 5, wherein said belt conveyor sections are connected to a common drive through a common chain transmission equipped with a tensioning sprocket for compensating length variations.

7. Apparatus according to claim 1, wherein said sweeping means comprise a further rake that has prongs engaging between said prongs of said transfer rake and that is movable up to pallet.

8. Apparatus according to claim 1, wherein said prongs of said transfer rake are removable.

9. Apparatus according to claim 1, including a stop plate extending upward from said transfer rake and having the longitudinal axis thereof transverse with the conveying direction and equipped with a contact for actuating transfer movement of said transfer rake.

* * * * *